(12) United States Patent
Kalama et al.

(10) Patent No.: US 11,360,471 B1
(45) Date of Patent: Jun. 14, 2022

(54) ROBOTIC SHERPA

(71) Applicant: Disney Enterprises, Inc., Burbank, CA (US)

(72) Inventors: Asa K. Kalama, Burbank, CA (US); Robert Scott Trowbridge, Burbank, CA (US); Scott Watson, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 574 days.

(21) Appl. No.: 16/389,831

(22) Filed: Apr. 19, 2019

(51) Int. Cl.
| | |
|---|---|
| *G05D 1/00* | (2006.01) |
| *H04N 5/225* | (2006.01) |
| *H04N 7/18* | (2006.01) |
| *G07C 9/00* | (2020.01) |
| *B60R 25/25* | (2013.01) |
| *G05D 1/02* | (2020.01) |
| *B60R 25/24* | (2013.01) |
| *H04N 5/247* | (2006.01) |
| *G01S 19/13* | (2010.01) |

(52) U.S. Cl.
CPC ........... *G05D 1/0038* (2013.01); *B60R 25/24* (2013.01); *B60R 25/25* (2013.01); *G05D 1/0055* (2013.01); *G05D 1/0231* (2013.01); *G07C 9/00182* (2013.01); *G07C 9/00563* (2013.01); *H04N 5/2253* (2013.01); *H04N 7/185* (2013.01); *B60R 2325/103* (2013.01); *G01S 19/13* (2013.01); *G07C 2009/0019* (2013.01); *G07C 2009/00777* (2013.01); *H04N 5/247* (2013.01)

(58) Field of Classification Search
CPC .. G05D 1/0038; G05D 1/0055; G05D 1/0231; B60R 25/24; B60R 25/25; B60R 2325/103; G07C 9/00182; G07C 9/00563; G07C 2009/0019; G07C 2009/00777; H04N 5/2253; H04N 7/185; H04N 5/247; G01S 19/13

USPC .............................................................. 701/2
See application file for complete search history.

(56) References Cited

U.S. PATENT DOCUMENTS

| | | | | |
|---|---|---|---|---|
| 10,654,394 | B2* | 5/2020 | Goldberg | G07F 17/12 |
| 2016/0180618 | A1* | 6/2016 | Ho | G07C 9/00563 340/5.52 |
| 2018/0024554 | A1* | 1/2018 | Brady | G06Q 10/0833 701/23 |
| 2019/0056733 | A1* | 2/2019 | Ferguson | A23L 7/109 |
| 2020/0026280 | A1* | 1/2020 | Xiao | G05D 1/0016 |

* cited by examiner

*Primary Examiner* — Muhammad Shafi
(74) *Attorney, Agent, or Firm* — Kilpatrick Townsend & Stockton LLP

(57) ABSTRACT

Embodiments disclosed herein include a mobile locker. The mobile locker can include a mobility unit to enable the locker to relocate from one location to another. The mobile locker is modular which allows the storage compartment to be detached from the mobility unit for storage, transfer via other means. The storage compartment can be coupled either the same or a different mobility unit. The mobile lockers can be recalled by a customer to either the customer's location or to designated locations at the venue. The lockers can include any one of multiple locking mechanisms. The mobile locker can communicate with a monitoring center that oversees the deployment of multiple mobile lockers. Embodiments of the mobile locker can interact with customers through a display, microphone, and speaker.

20 Claims, 10 Drawing Sheets

ROBOTIC SHERPA

FIELD

The present disclosure relates generally to robotic storage devices.

BACKGROUND

Patrons of large venues (e.g., amusement parks) pack and carry many items with them, but only need a few of those items at different points during the day. For example, lunch may be packed, but it is needed at only at one point in the day. Umbrellas or outerwear may be needed sporadically based on current weather conditions, but these items are currently carried all day. Conversely, in-venue purchases create a burden of carrying the items for the rest of the day or until a suitable storage locker is found. Even in a shopping mall, for example, the need to carry purchases can limit the ability to continue shopping. Alternatively, items can be stored in physical lockers that may be difficult to access when the time comes to retrieve the items, especially if the lockers are located on the other side of the venue.

BRIEF SUMMARY

Certain embodiments are directed to devices for mobile lockers that can easily summoned by customers, provide a storage container to secure valuables, and be stored in a secure location. Customers can recall the mobile lockers, even if they are located in different areas of a venue, to retrieve their stored belongings. The mobile lockers can be monitored, and in some cases, remotely driven by personnel in a monitoring center.

In various embodiments, a mobile locker can include: a storage container having a locking mechanism, the storage container removably coupled to a mobility unit. The mobility unit can include a navigation unit capable of developing a route to a geographic location, a proximity sensor to detect one or more objects, a powertrain unit capable of moving the mobile locker via the route to the geographic location. The mobile locker can also include a communication unit integrated into the storage container, the communication unit comprising a transceiver for sending and receiving one or more electronic signals. The mobile locker can also include a power unit capable of providing power to the storage container, the communication unit, and the mobility unit.

In various embodiments, the storage container can include a biometric locking device. In embodiments, the storage container includes a mechanical locking device. In various embodiments, the storage container can include a near field communications locking device.

In various embodiments, the storage container can includes an insulated compartment for cold storage. The mobile locker can include one or more cameras affixed to the storage container. The one or more cameras can transmit images through the communication unit. In various embodiments, the logic unit can provide a commanded destination to the navigation unit. The mobile locker can include a microphone communicatively connected to the communication unit. The mobile locker can include a speaker communicatively connected to the communication unit.

In various embodiments, powertrain unit comprises two or more wheels with electrical hub motors. The powertrain unit can receive electrical power from a power supply. In various embodiments, the power supply is rechargeable.

In various embodiments, the communication unit transmits live video from to a monitoring center. The communication unit can transmit geographic position of the mobile locker to a communication center module. The proximity sensor can be configured to detect pedestrians and vehicles for collision avoidance. The mobile locker can also include a display affixed to the storage container.

In an aspect, a method can include receiving, by an electronic device, a selection of a command for a mobile locker. The method can include transmitting, by the electronic device, the command via a communication network to the mobile locker. The method can include receiving, by the electronic device, an indication that the command was received by the mobile locker. The method can include receiving, by the electronic device, a current location of the mobile locker.

In various embodiments, the command can include a navigation command for the mobile locker. The command can include a locking command for the mobile locker.

In an aspect, a system of mobile lockers is disclosed. The system can include one or more mobile lockers communicatively connected to a monitoring center view a communication network. The system can include one or more displays in the monitoring center for monitoring fault status, external views, and power level of the one or more mobile lockers. The system can include one or more controls in the monitoring center for remote control of the one or more mobile lockers.

The system can include a mobile power unit to recharge the one or more mobile lockers.

A better understanding of the nature and advantages of embodiments of the present disclosure may be gained with reference to the following detailed description and the accompanying drawings.

DETAILED DESCRIPTION

Certain embodiments of the present disclosure relate to mobile lockers, systems and techniques for employing mobile lockers.

Figure 1:
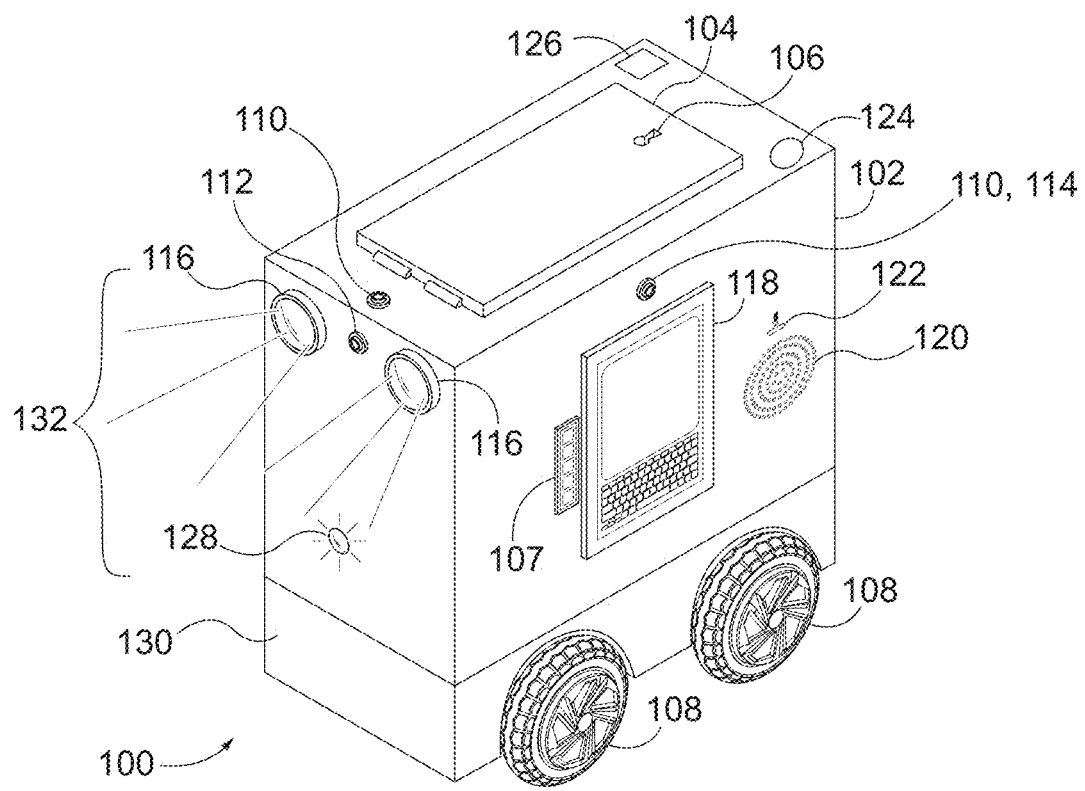
FIG. 1 illustrates an exemplary profile view of a mobile locker.

FIG. 1 illustrates an exemplary top profile view of a mobile locker 100. The mobile locker 100 can include a cabinet 102 defining an internal space having two lateral walls, a rear wall, a front door, a bottom, and a top. The top can include a latch 104 to access the interior space of the cabinet. The latch 104 can be attached to the top of the cabinet via one or more hinges. The latch 104 can include a locking mechanism 106. The locking mechanism 106 can be a mechanical lock comprising a mechanical lock and key, can be an electro-mechanical lock, can be a lock operated remotely through a wireless signal, or can a lock operated from a near field communication signal.

The mobile locker 100 can comprise multiple wheels 108 affixed to the cabinet. In some embodiments, the wheels 108 can include a motorized hub. In some embodiments, the mobile locker 100 can include four wheels 108. In some embodiments, each of the wheels 108 can include a motorized hub. In some embodiments, two of the four wheels 108 can include a motorized hub. The motorized hub can received electrical power from a power unit 1008 (shown in FIG. 10) capable of driving the motorized hub.

The mobile locker 100 can include one or more cameras 110. The one or more cameras 110 can include a front facing camera 112. The front facing camera 112 can be powered by the power unit and be connected to a communication unit, to transfer captured images from the front facing camera 112 to a monitoring center. In various embodiments, the cabinet 102 can include a right side camera 114, a top camera, a left side camera, not shown, a rear camera, not shown. The front facing camera 112, the right side camera 114, the left side camera, and the rear camera can individually be configured for a wide field of view. The cameras 110 can be motion activated, activated through user interaction with the mobile locker 100 or activated remotely from a monitoring center.

The mobile locker 100 can include one or more lights 116 to illuminate the area in front of the mobile locker 100. The lights 116 can be receive electrical power from a power unit and can be controlled by a an internal logic unit. The lights 116 can be remotely controlled by a monitoring center. In some embodiments, additional lights can be incorporated on the left and right sides of the cabinet 102 or in the rear of the cabinet 102.

The mobile locker 100 may have one or more display(s) 118. The display 118 can be a liquid crystal display (LCD), organic light emitting diode (OLED), active-matrix organic light emitting diode (AMOLED), super active-matrix organic light emitting diode (Super AMOLED), thin film transistor (TFT), in-plane switching liquid (IPS), or thin film transistor liquid crystal display (TFT-LCD) that typically can be found a computing device. The display(s) 118 can include a touch screen which can provide a user interface for interacting with the mobile locker 100 or for interacting with the monitoring center. In some embodiments, the display(s) 118 can display one or more animated characters for interacting with users. The animated characters can form a visual representation of an intelligent service agent. The display(s) 118 can be powered by the power unit.

The mobile locker 100 can include a speaker 120 and a microphone 122 for interacting with users. The speaker 120 can also be used for sounding alerts to warn pedestrians when the mobile locker 100 transits from one location to another. The mobile locker 100 can include a keypad 107. The keypad 107 can be used to enter one or more codes to open the locking mechanism 106.

The mobile locker 100 can include a communication antenna 124. The communication antenna 124 can allow for one or two-way communications with a monitoring center. The communications antenna 124 can allow for remote control of the mobile locker 100. The communications antenna 124 can transmit a position and status of the mobile locker 100, images from one or more cameras, and/or voice data from the microphone to the monitoring center. The communications antenna 124 can receive navigation commands, locking/unlocking commands, voice information, and video information from the monitoring center.

The mobile locker 100 can include a navigation antenna 126. The navigation antenna 126 can be a Global Positioning System (GPS) antenna to determine a precision location of the mobile locker 100. The navigation antenna 126 may also work with a Differential Global Positioning System (DGPS). DGPS provide enhancements to the Global Positioning System (GPS) which provide improved location accuracy, in the range of operations of each system, from the 15-meter nominal GPS accuracy to about 10 cm in case of the best implementations. The navigation antenna 126 can receive precise position information and provide this information to the mobility unit. Other conventional navigation systems can also be employed to determine a precise location of the mobile locker 100.

The mobile locker 100 can include one or more proximity sensors 128. The proximity sensors 128 can be incorporated in one or more sides of a mobile locker 100. In some embodiments, multiple proximity sensors 128 can be installed on a single side of the mobile locker 100. The proximity sensors 128 can detect objects or persons within a preselected distance from the proximity sensors 128. The proximity sensors 128 can transmit the sensor information to the mobility unit for safe transit of the mobile locker 100.

In some embodiments, the mobile locker 100 can comprise a mobility unit 130 and a storage unit 132. The storage unit 132 can couple with the mobility unit 130 via any number of conventional techniques. The mobility unit 130 can include a navigation unit 1002 (shown in FIG. 10), the powertrain unit 1004 (shown in FIG. 10), one or more proximity sensors 1006 (shown in FIG. 10), the power unit 1008 (shown in FIG. 10), and the balancing unit 1010 (shown in FIG. 10). In some embodiments, the storage unit 132 can uncouple from the mobility unit 130 in a storage area. In this way there can be many more storage units 132 as compared to mobility units 130. Once decoupled from the mobility unit 130 the storage unit 132 can be stored alone or with a plurality of other storage units 132. Further, one of more storage units 132 can be stored in one or more storage facilities located throughout a venue. The storage units 132 can be transported separate from the mobility unit 130 from the storage facility to one or more designed locations throughout the venue. For example, near closing time, the storage units can be transported to a designated area near the exit to the venue. In some embodiments, a conveyor system can transport the storage units 132 to a different storage area or a designated area in the venue. In some embodiments, the storage units 132 can be uncoupled from the mobility units 130 can stored on a shelf.

In some embodiments the storage unit 132 can include a connector that couples the data communications and electrical power from the mobility unit 130 to the storage unit 132. In some embodiments, the storage unit 132 can couple with the mobility unit through one or more conventional means such as one or more latches, fasteners, magnetic couplers, mechanical linkage, straps, and a crossbar.

Figure 2:
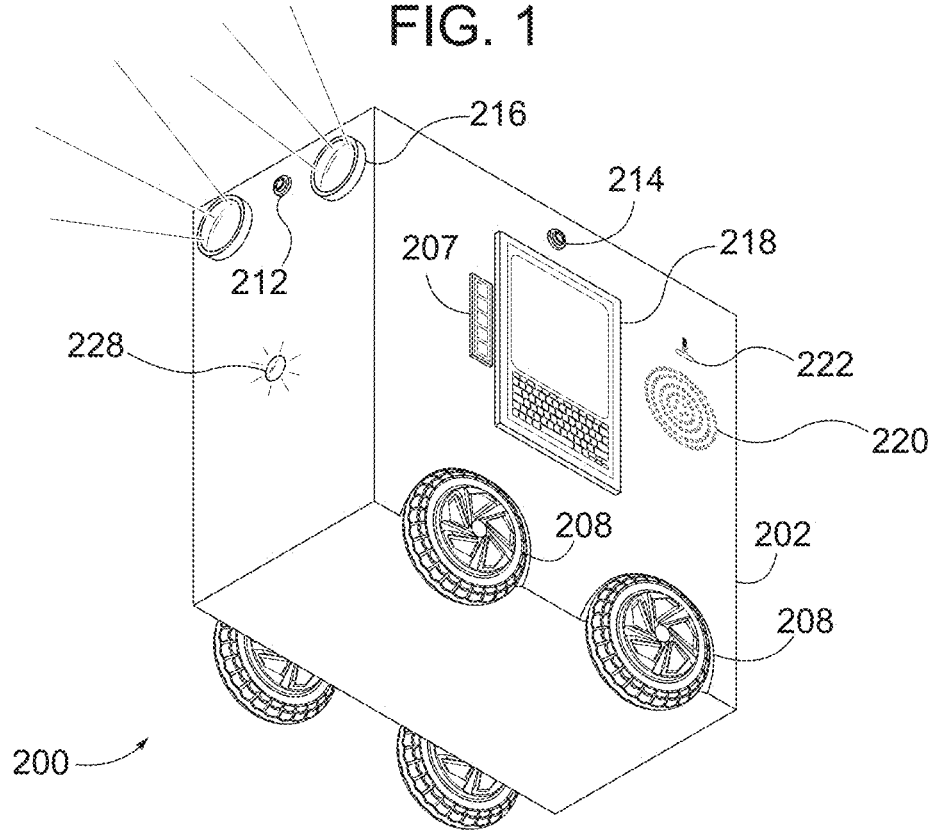
FIG. 2 illustrates an exemplary bottom view of a mobile locker.

FIG. 2 illustrates an exemplary side bottom profile of a mobile locker 200. FIG. 2 illustrates a cabinet 202 including one or more wheels 208 with hub motors that can transport the mobile locker 200 from one location to another. Multiple cameras such as a front camera 212, a side camera 214, and a back camera can provide images around the mobile locker 200. The side view shows the bottom of the mobile locker 200. FIG. 2 also depicts one or more lights 216 on the front side of the cabinet 202, an electronic keypad 207, a display 218, a speaker 220, a microphone 222, and a proximity sensor 228.

Figure 3:
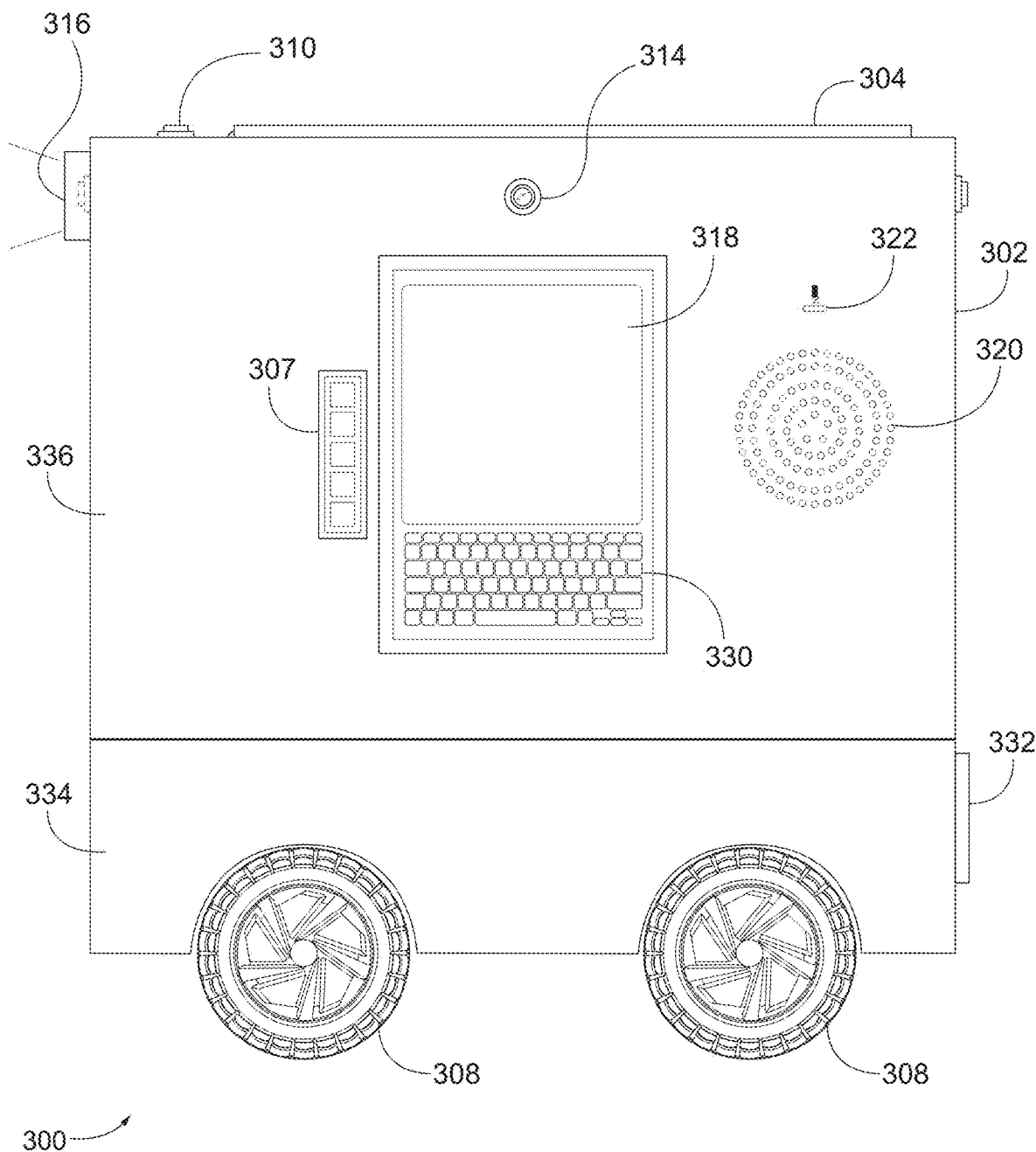
FIG. 3 illustrates an exemplary side view of a mobile locker.

FIG. 3 illustrates an exemplary side view of a mobile locker 300. FIG. 3 illustrates a cabinet 302 including one or more wheels 308 with hub motors that can transport the mobile locker 300 from one location to another. Multiple cameras such as a side camera 314, and a back camera, not shown, a top camera 310 can provide images around the mobile locker 300. FIG. 3 also depicts one or more lights 316 on the front side of the cabinet 302, an electronic keypad 307, a display 318, a speaker 320, a microphone 322, and a proximity sensor. FIG. 3 depicts a latch 304 on the top of the cabinet 302. In some embodiments, the mobile locker 300 can have a keyboard 330 or a virtual keyboard on the display 318. FIG. 3 also depicts a maintenance panel 332. The maintenance panel 332 can have a receptacle for receiving electrical power to recharge the power supply. In some embodiments, the maintenance panel 332 can have a receptacle for data transfer between a logic unit and a monitoring center.

FIG. 3 depicts a mobility unit 334 and a detachable storage unit 336. The detachable storage unit 336 can be attached to different mobility units 334. In this way, the number of detachable storage units 336 can exceed the number of mobility units 334. The detachable storage units 336 can also transported to one or more areas of a venue using other transportations means (e.g., trams, conveyor belt systems, etc.). Once located at a different part of the venue the detachable storage unit 336 can be attached to a mobility unit 334.

Figure 4:
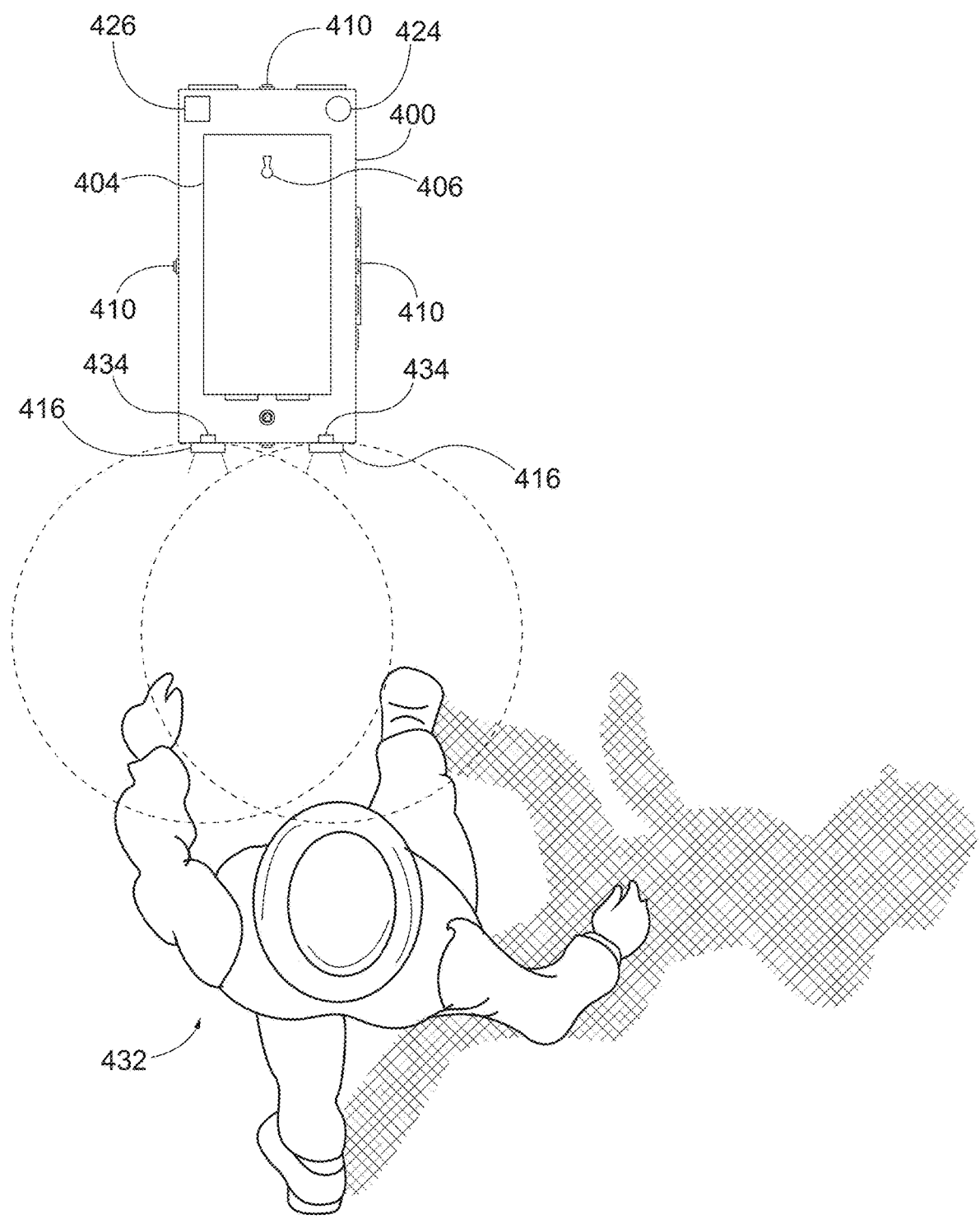
FIG. 4. illustrates an exemplary top view of a mobile locker.

FIG. 4 illustrates a top view of the mobile locker 400 interacting with a pedestrian 432. The mobile locker 400 can include one or more proximity sensors 434. The proximity sensors 434 can detect the presence of nearby objects without any physical contact. A proximity sensor 434 can emits an electromagnetic field or a beam of electromagnetic radiation (i.e., infrared), and looks for changes in the field or return signal. The object being sensed can be referred to as the proximity sensor's target. A proximity sensor 434 can be installed on a front of the mobile locker 400. Alternatively, multiple proximity sensors 434 can be installed on the front of the mobile locker 400. In some embodiments, the proximity sensors 434 can be installed on the sides of the rear of the mobile locker 400. The proximity sensor 434 can detect the presence of objects 432 or personnel within a set range from the mobile locker 400. The set range can be adjusted manual or via programming. For example, the set range can increase as the speed of the mobile locker 400 increases. The proximity sensor 434 can trigger warnings to personnel in the vicinity of the mobile locker 400 when moving. The proximity sensor 434 can detect potential collisions and issue commands to the powertrain unit to maneuver or stop to avoid collisions. The proximity sensor 434 can transmit warnings through the communication unit to the monitoring center. FIG. 4 also illustrates the latch 404, the locking mechanism 406, one or more cameras 410, one or more lights 416, a communications antenna 424, and a navigation antenna 426.

Figure 5:
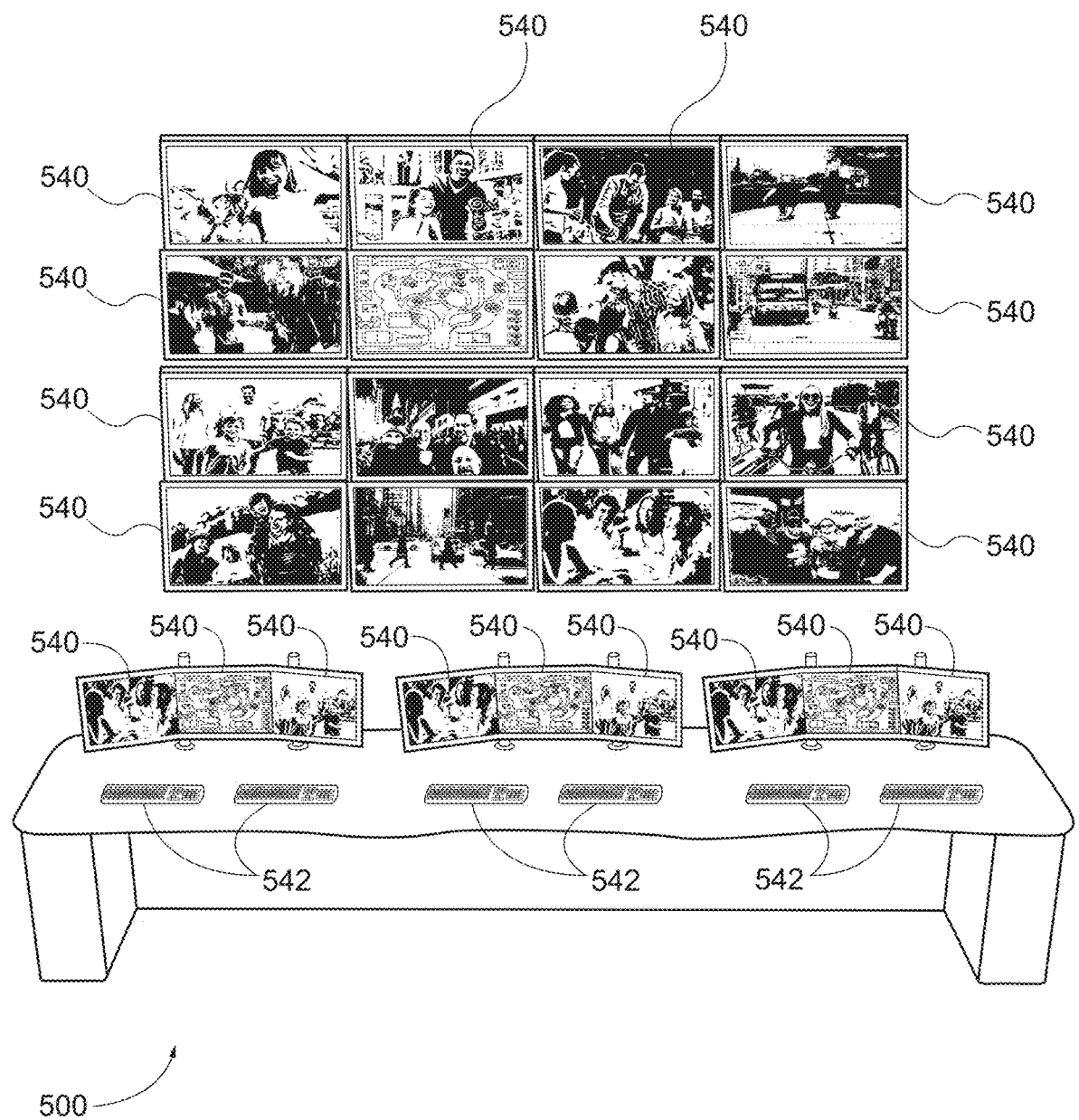
FIG. 5 illustrates an exemplary view of a monitoring center.

FIG. 5 illustrates a simplified diagram of a monitoring center 500. A monitoring center 500 can be located either within a venue or off-site to monitor one or more mobile lockers. The monitoring center can be staffed by one or more technicians. The technician can monitor or more displays 540. The monitoring center 500 can have controls (e.g., keyboard 542 and cursor control, not depicted) to change the views of the displays 540. The monitoring center 500 can also include one or more microphones, not shown, and one or more cameras, not shown, to allow a technician to interact with the customers remotely. Although twenty-five displays 540 are depicted in FIG. 5, the monitoring center 500 is not limited to a set number of displays 540. The displays 540 can display the images from the one or more cameras from the mobile lockers 502. The displays 540 can also a map of a venue indicating the position of one or more mobile lockers 502 in the venue. The displays 540 can display a status board indicating the position, power level, and status for each of the mobile lockers 200, as shown in FIG. 2.

Figure 6:
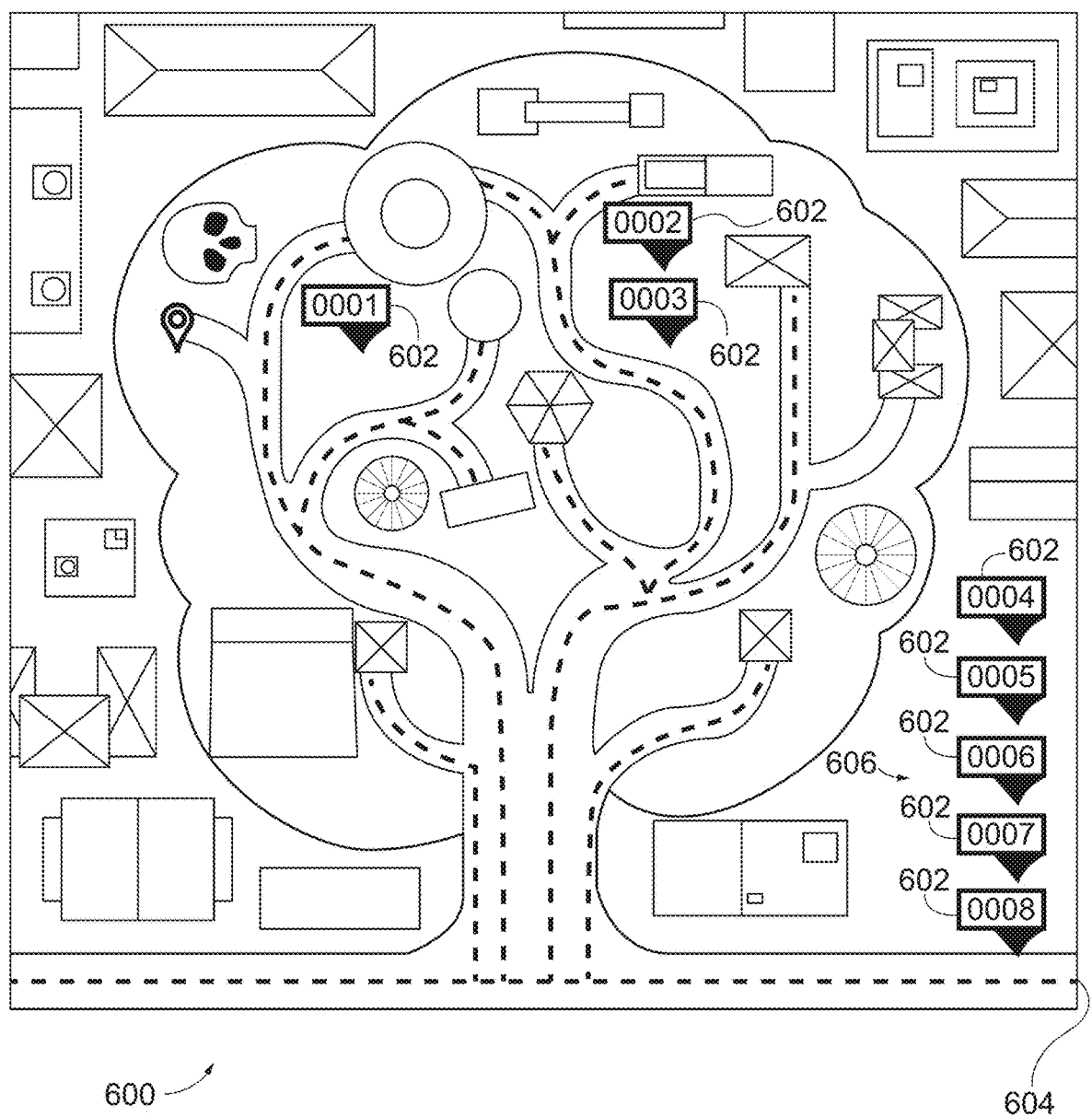
FIG. 6 illustrates an exemplary map for a mobile locker system.

FIG. 6 illustrates a map 600 of a venue. The map 600 can illustrate the current position of one or more mobile lockers 200, as shown in FIG. 2. The map 600 can use symbols to indicate the mobile lockers on the map. The map 600 can be of a large venue (e.g., an amusement park). In some embodiments, the map 600 can illustrate the layout of an indoor or outdoor shopping center (e.g., a mall). The dashed lines on the map 600 indicates the designated travel paths 604 for moving or relocating the one or more mobile lockers 602. The one or more mobile lockers 602 can be stored at a central storage facility 606. In various embodiments, the one or more mobile lockers 602 can transit designated areas of the venue for loading and unloading. For example, if a venue has one or more sub-areas, each sub-area can have a designated area for mobile lockers 602. In some embodiments, the mobile lockers 602 can transit along paths not available to the public (e.g., backstage, staff access paths/roads, underground transit paths). In some embodiments, the map 600 can be displayed on a computing device (e.g., mobile phone, tablet, wearable device) of a customer. In such embodiments, the only the customer's rented mobile locker 602 will be displayed on the computing device. In some embodiments, a customer may select the location on the map 600 as the destination for the mobile locker 602.

Figure 7:
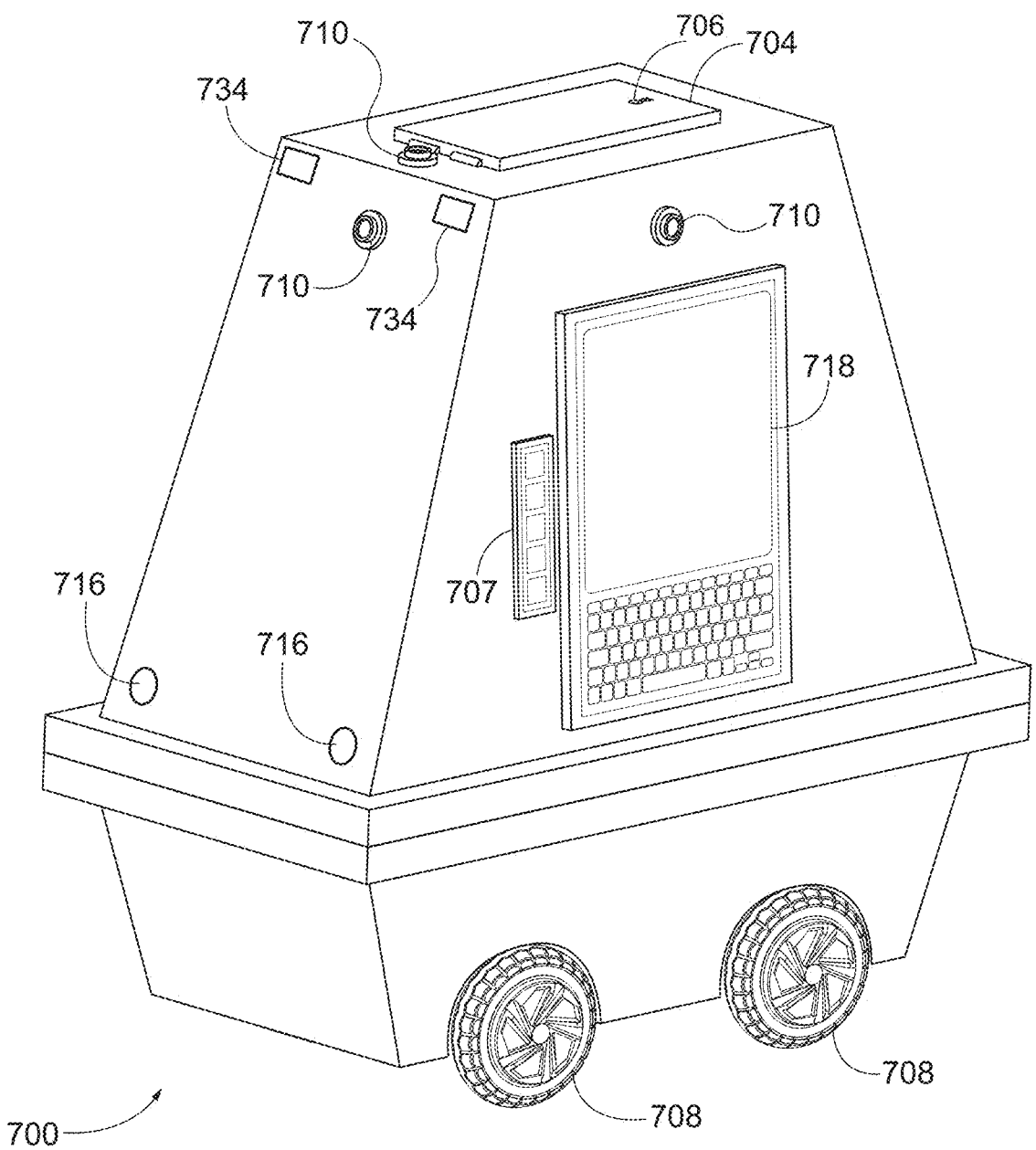
FIG. 7 illustrates an a themed embodiment of a mobile locker system.

FIG. 7 illustrates an a themed embodiment of a mobile locker system. The mobile locker 700 can include a themed design (e.g., a drone). The themed mobile locker 700 of FIG. 7 is similar to the mobile locker 100, shown in FIG. 1, because the mobile locker 700 can include a latch 704, a locking mechanism 706, a keypad 707, one or more wheels 708, one or more cameras 710, and a display 718. The mobile locker 700 can include one or more lights 716 and one or more proximity sensors 734.

Figure 8:
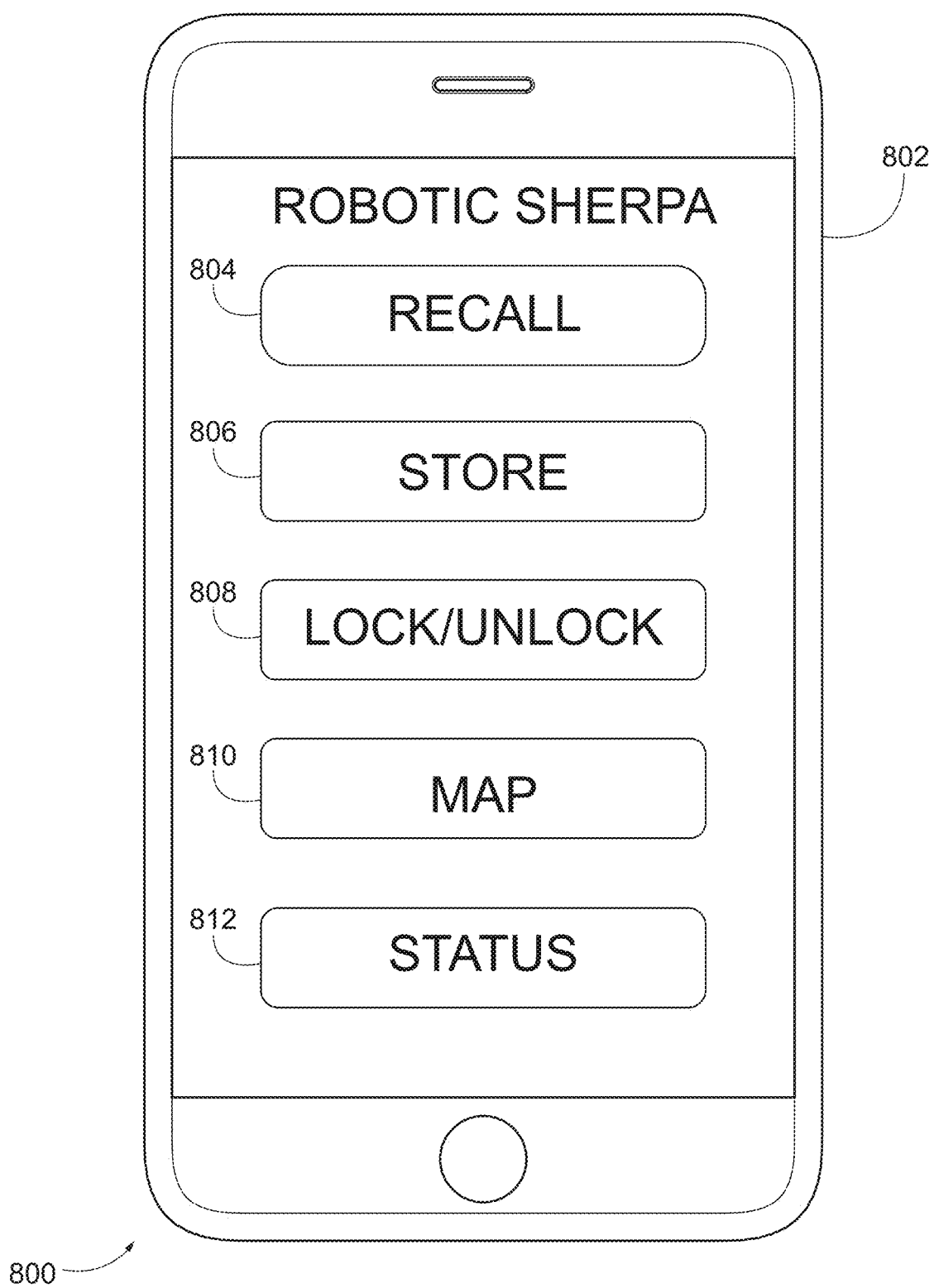
FIG. 8 illustrates a graphical user interface for a mobile locker system.

FIG. 8 illustrates a graphical user interface 800 for a mobile locker system. The graphical user interface 800 can part of an application for a computing device 802 (e.g., a smartphone or a tablet). The computing device can be an Apple based product (e.g., iPhone) or an Android based smartphone manufactured by various manufacturers. The graphical user interface 800 can include one or more active buttons. Selecting the one or more active buttons on the display for a computing device 802 can perform several functions on the mobile lock. In various embodiments, the one or more active buttons can include a recall button 804, a store button 806, a lock/unlock button 808, a map button 810, a status button 812. In various embodiments, a customer can rent a mobile locker for use in a given venue. During the rental process, a customer can be prompted to download an application on a computing device 802 and link a given mobile locker to a customer's computing device 802. After linking, a customer can transmit one or more commands from the computing device 802, query the location of the linked mobile locker, or display the status of the mobile locker. The computing device 802 can display a graphical user interface 800. By selecting the recall button 804, a signal can be transmitted from the computing device 802 to a mobile locker to transit to the location of the computing device 802. In some embodiments, the signal can be transmitted to a monitoring center and further transmitted to the mobile locker. In some embodiments, the geographic location of the computing device 802 can be obtained from a navigation system on the computing device 802 and transmitted to the mobile locker. In some embodiments, the signal with the geographic location of the computing device 802 can be transmitted via the monitoring center.

In various embodiments, the store button 806 can send the mobile locker to a storage facility. The storage facility can depend on the starting geographic starting location of the mobile locker. In some embodiments, the storage facility can be a single storage facility for the venue. In some embodiments, selecting the store button 806 can command the mobile locker to the nearest storage facility to the mobile locker. In some embodiments, predictive analytics can be used to send the mobile locker to a storage facility closest to an event (e.g., a storage facility near an exit towards the end of the day).

FIG. 8 depicts a lock/unlock button 808. Selecting the lock/unlock button 808 can send a signal from the computing device 802 to the mobile locker. In some embodiments, the signal can be transmitted via the monitoring center. In some embodiments, selecting the lock/unlock button 808 can transmit a near-field communications signal that can be received by a near-field communications receiver.

FIG. 8 depicts a map button 810. Selecting the map button 810 can display a map of the venue on the computing device 802. The current geographic location of the mobile locker can be depicted on the map of the venue. The current geographic location of the computing device 802 can also be depicted on the computing device 802. One or more locations of the venue, in addition to paths, can also be depicted on the map.

FIG. 8 depicts a status button 812. Selecting the status button 812 can display the status of the mobile locker. The status can include: operational status (e.g., en route destination, stored, locked/unlocked, geographic location, battery charge, fault codes).

In accordance with various embodiments, one or more buttons may not be included in the graphical user interface. Alternatively, additional buttons may be included that are not depicted in FIG. 8.

Figure 9:
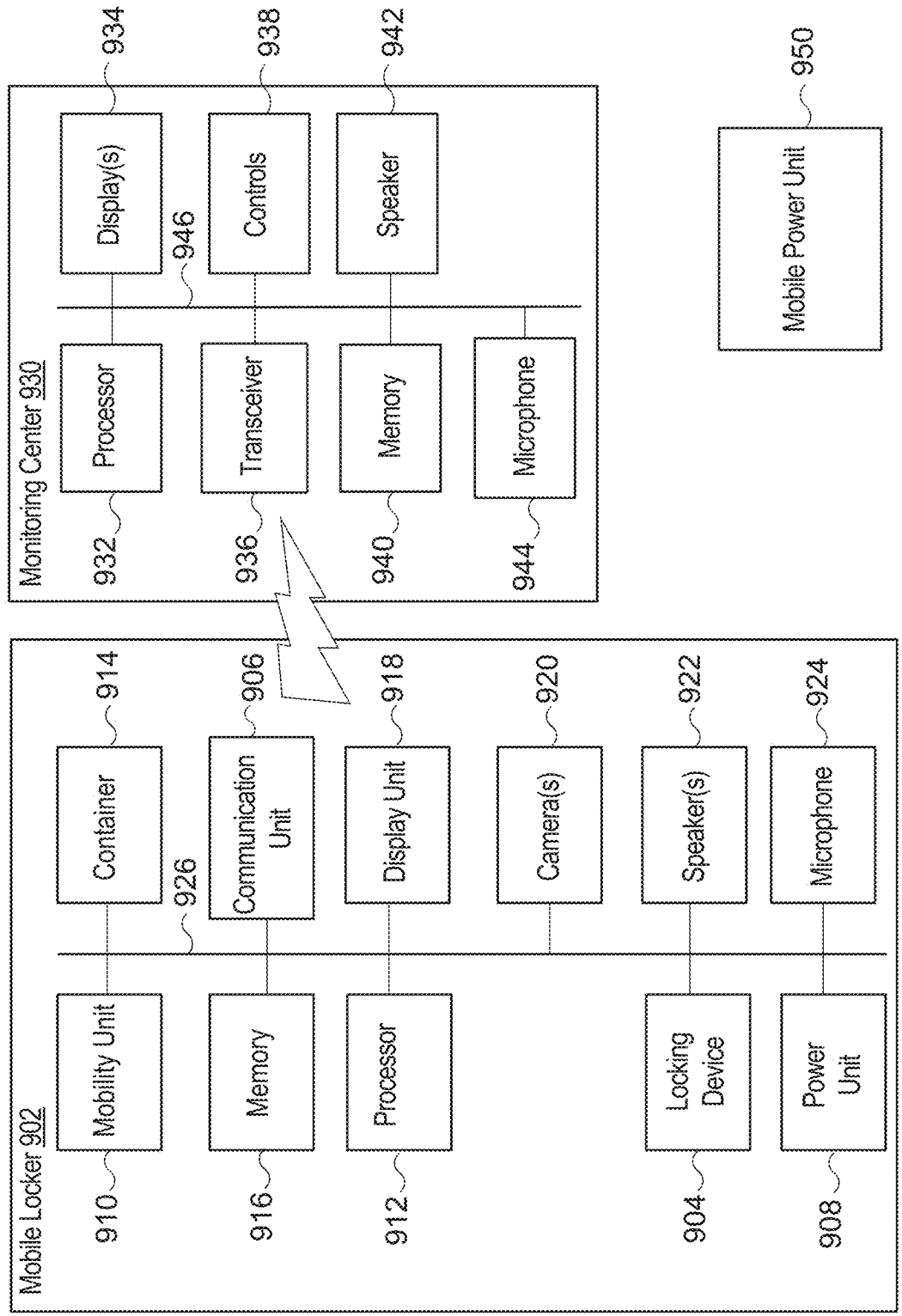
FIG. 9 illustrates a simplified box diagram for a mobile locker system.

FIG. 9 illustrates a simplified diagram of a system 900 for a mobile locker 902. FIG. 9 illustrates the mobile locker 902 that can include including various components including a locking device 904, a communication unit 906, a power unit 908, a mobility unit 910, a processor 912, a security container 914, a memory 916, a display unit 918, one or more cameras 920, one or more speakers 922, and a microphone 924. The various components of the mobile locker 902 can communicate information via a data bus 926. The monitoring center 930 can comprise a processor 932, one or more displays 934, a transceiver 936, one or more controls 938, a memory 940, a speaker 942, a microphone 944. The various components of the monitoring center 930 can communicate via a data bus 946. The system can also include a mobile power unit 950.

The communication unit 906 facilitates communication with other devices or the monitoring center 930 over one or more external ports or via wireless circuitry and includes various software components for handling data received from wireless circuitry and/or external port. External port (e.g., universal serial bus (USB), FireWire, 60-pin connector, etc.) is adapted for coupling directly to other devices or indirectly over a network (e.g., the Internet, wireless local area network (LAN), etc.). The communication unit 906 can utilize at least one network that would be familiar to those skilled in the art for supporting communications using any of a variety of commercially-available protocols, such as Transmission Control Protocol (TCP) and the Internet Protocol (IP), open systems interconnection protocols (OSI), file transfer protocol (FTP), universal plug and play protocol (UPnP), network file system (NFS), and common internet file system (CIFS). The network can be, for example, a cellular network, a local area network, a wide-area network, a virtual private network, the Internet, an intranet, an extranet, a public switched telephone network, an infrared network, a wireless network, and any combination thereof. The communication unit 906 can use the communications antenna 124, shown in FIG. 1, to transmit a position of the mobile locker 902, a status of the mobile locker 902, images from one or more cameras 920, voice data from the microphone 924 to the monitoring center 930. The communication unit 906 can receive navigation commands, voice information, or video information from the monitoring center 930. The navigation commands can be transmitted to the mobility unit 910 via the data bus 926.

The power unit 908 provides electrical power to operate the mobile locker 902. The power unit 908 can include one or more power cells that can include a lithium-ion battery, a nickel cadmium (NiCd) battery, nickel metal hydride, a lead acid battery, or any available battery. The power unit 908 can be recharged in numerous ways. The power unit 908 can recharge the power cells via an electrical connection to standard household power, or a stationary or mobile generator. In some embodiments the power unit 908 can recharge the power cells via separate mobile power unit 950. The power unit 908 can monitor the power level of the power cells and if recharging becomes necessary send notification via the transceiver 936 to the communication unit 906. If the power unit 908 detects the power level of the power cells dropping below a threshold level the power unit 908 can selectively deactivate one or more features of the mobile locker 902.

The mobility unit 910 allows the mobile locker 902 to move from one location to another. The primary components of the mobility unit 910 include the wheels 108, depicted in FIG. 1, a navigation unit, and a motor to drive the wheels. In various embodiments, the wheels can be driven by an electric motor connected to the power unit 908. In some embodiments the electric motors can comprise hub motors inside the wheels 108. In some embodiments the mobility unit 910 can include one or more proximity sensors 1006, and a balancing unit 1010. The specific components of the mobility unit 910 will be discussed in conjunction with FIG. 10.

The monitoring center 930 can receive information from multiple mobile lockers 902. The monitoring center 930 can receive information on the location of the mobile lockers 902 throughout a venue. The monitoring center 930 can be staffed with one or more technicians to ensure the safety of customers at the venue especially as the mobile lockers 902 are relocated throughout the venue. The monitoring center 930 can receive the wireless signals from the mobile lockers 902 via the transceiver 936. The wireless signals can include the lock status, power levels, and event schedules for a venue. The technician can interact with the customers of the mobile locker 902 through the speaker 942 and the microphone 944 in the monitoring center 930. The voice information from the technician can be transmitted to the transceiver 936 via the data bus 946. The transceiver 936 can transmit the voice information to the mobile locker 902 via a wireless signal. The technician can remotely monitor the relocation of the mobile locker 902.

The transceiver 936 can utilize at least one network that would be familiar to those skilled in the art for supporting communications using any of a variety of commercially-available protocols, such as TCP/IP, OSI, FTP, UPnP, NFS, and CIFS. The network can be, for example, a cellular network, a local area network, a wide-area network, a virtual private network, the Internet, an intranet, an extranet, a public switched telephone network, an infrared network, a wireless network, and any combination thereof. The transceiver 936 can receive the positions of the one or more mobile lockers 902, a status of a locking mechanism for the locker, images from one or more cameras, voice data from the microphone to the communications center. The transceiver 936 can transmit navigation commands, voice information, video information, and price information from the monitoring center 930.

The transceiver 936 receives data from one or more mobile lockers 902. The transceiver 936 can receive lock status, geographic location, power level, fault codes from one or more mobile lockers 902. The transceiver 936 can save the received information to a memory 940 via the data bus 946. The technicians in the monitoring center 930 can transmit commands via the transceiver 936 to recall lockers 902 with low power levels, fault codes, or low sales for the deployed location.

Figure 10:
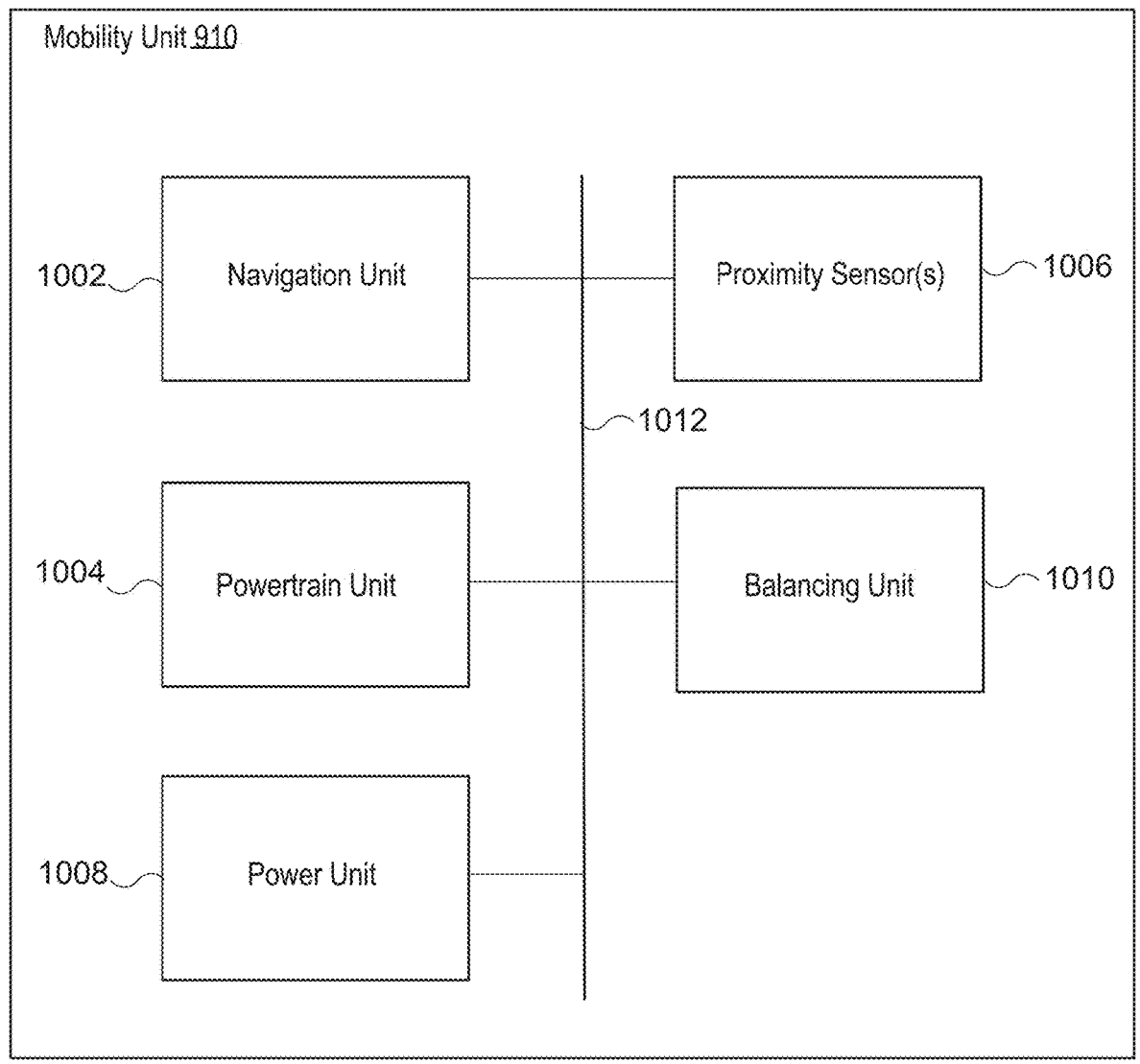
FIG. 10 illustrates a simplified box diagram for a mobility unit of a mobile locker system.

FIG. 10 illustrates a simplified box diagram for a mobility unit 910. The mobility unit 910 can include a navigation unit 1002, one or more proximity sensors 1006, a powertrain unit 1004, and balancing unit 1010. The navigation unit 1002 can include a precision positioning system. The precision positioning system can include a navigation antenna to receive navigation signals and a signal processor to interpret a precise location from the received navigation signals. An example of a precise location system includes the Global Positioning System (GPS). Differential Global Positioning Systems (DGPS) can provide improved location accuracy, in the range of operations of each system, from the 15-meter nominal GPS accuracy to about 10 cm in case of the best implementations. The navigation unit 1002 can include a map for a venue that specifies permissible travel areas. The navigation unit 1002 can receive a commanded location from the monitoring center 930 via the transceiver 936. The navigation unit 1002 can program a route for the mobile locker 902 to travel from the present location of the mobile locker 902 to a commanded location. In some embodiments, a technician at the monitoring center 930 can monitor the travel of the mobile locker 902 from the present location to the commanded location via the camera 920 on the mobile locker and the display 934 in the monitoring center 930. In some embodiments, the technician can remotely drive the mobile locker 902 via controls in the monitoring center 930.

The mobility unit 910 can include one or more proximity sensors 1006. A proximity sensor 1006 is a sensor able to detect the presence of nearby objects without any physical contact. A proximity sensor 1006 can emits an electromagnetic field or a beam of electromagnetic radiation (infrared, for instance), and looks for changes in the field or return signal. The object being sensed can be referred to as the proximity sensor's target. A proximity sensor 1006 can be installed on a front of the mobile locker 302. Alternatively, multiple proximity sensors 1006 can be installed on the front of the mobile locker 302. In some embodiments, the proximity sensors 1006 can be installed on the sides of the rear of the mobile locker. The proximity sensor 1006 can detect the presence of objects or personnel within a set range from the mobile locker 902, shown in FIG. 9. The set range can be adjusted. For example, the set range can increase as the speed of the vending machine increases. The proximity sensor 1006 can trigger warnings (via the speaker 320 on the mobile locker 302) to persons in the vicinity of the mobile locker 302 when moving. The proximity sensor 1006 can sense potential collisions and issue commands to the powertrain unit 1004 to maneuver or stop to avoid collisions. The proximity sensor 1006 can transmit warning through the communication unit 906 to the monitoring center 930.

The powertrain unit 1004 provides the motive force to move the mobile locker 902 from one location to another. The powertrain unit can include a motor. The motor can be an electrical, gas, fuel cell or other device to covert stored energy into work. In some embodiments the mobile locker 902 can have four wheels. In some embodiments, the motor can turn one or more wheels on the mobile locker 902. In some embodiments, all of the wheels can be powered. In some embodiments, the differential application of the power applied to the wheels provide turning capability for the mobile locker 902. In some embodiments, electrical hub motors can be inside the wheels to provide torque to maneuver the mobile locker 902. The electrical hub motors can receive electrical power from the power unit 1008. The in-wheel hub motors confer savings by eliminating the need for a transmission, differential, and related mechanical parts. That can reduce both the overall weight of the powertrain unit 1004 and energy losses due to friction.

The balancing unit 1010 can provide additional safety features to the mobile locker. The balancing unit 1010 can include a built in gyroscope to sense acceleration changes that could lead to the mobile locker 902 tipping over. The balancing unit 1010 can send corrective inputs to powertrain unit 1004 (e.g., the one or more hub motors) if angular acceleration detects a potential tip-over situation. The mobility unit 910 can include a bus 1012 to facilitate communications between the navigation unit 1002, the powertrain unit 1004, the power unit 1008, the proximity sensors 1006 and the balancing unit 1010.

Figure 11:
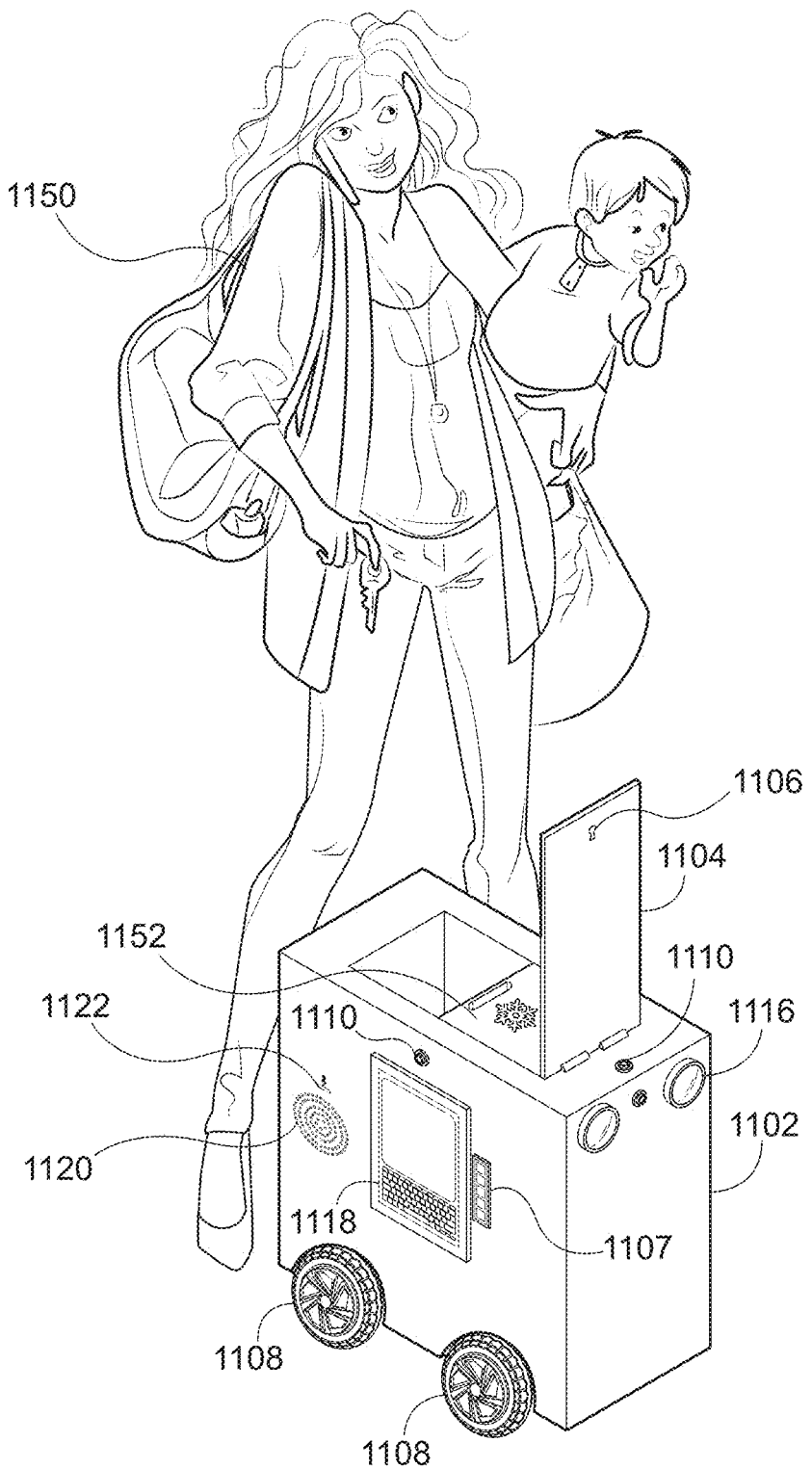
FIG. 11 illustrates an example use of a mobile locker system.

FIG. 11 illustrates an exemplary use of a mobile locker 1102. The mobile locker 1102 can include a lid 1104 with a locking mechanism 1106, a keypad 1107, one or more wheels 1108, and/or one or more proximity sensors 1110. The mobile locker 1102 can also include one or more headlights 1116, a display 1118, a speaker 1120, a microphone 1122. The mobile locker 1102 can have one or more internal compartments. For example, the mobile locker 1102 can have a cold storage compartment 1152 for storing perishable items. In some embodiments, a person can be visiting a venue with small children. Parents often bring several items or bags with them when they are traveling with a small children. The mobile locker 1102 can allow secure storage for these items or bags and enable easy retrieval when as they are needed. This allows for freeing up a parent's hands when they are with their children.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A mobile locker, comprising:
   a storage container having a locking mechanism, the storage container removably coupled to a mobility unit;
   the mobility unit, comprising:
      a navigation unit capable of developing a route to a geographic location;
      a proximity sensor to detect one or more objects; and
      a powertrain unit capable of moving the mobile locker via the route to the geographic location;
   a communication unit integrated into the storage container, the communication unit comprising a transceiver for sending and receiving one or more electronic signals; and
   a power unit capable of providing power to the storage container, the communication unit, and the mobility unit.

2. The mobile locker of claim 1, wherein the storage container further comprises a connector to transfer data communication and electrical power between the storage container and the mobility unit.

3. The mobile locker of claim 1, wherein the storage container includes a biometric locking device.

4. The mobile locker of claim 1, wherein the storage container includes a near field communication locking device.

5. The mobile locker of claim 1, wherein the storage container includes an insulated compartment for cold storage.

6. The mobile locker of claim 1, further comprising a one or more cameras affixed to an exterior of the storage container, wherein the one or more cameras can transmit images through the communication unit.

7. The mobile locker of claim 1, further comprising a logic module that predicts a desired destination of the mobile locker and transmits commands for the desired destination to the navigation unit.

8. The mobile locker of claim 1, further comprising a microphone communicatively connected to the communication unit.

9. The mobile locker of claim 1, further comprising a speaker communicatively connected to the communication unit.

10. The mobile locker of claim 1, wherein the powertrain unit comprises two or more wheels with electrical hub motors.

11. The mobile locker of claim 1, wherein the communication unit transmits live video from one or more cameras on the storage container to a monitoring center.

12. The mobile locker of claim 1, wherein the communication unit transmits a current geographic position of the mobile locker to a transceiver in a communications center.

13. The mobile locker of claim 1, wherein the proximity sensor is configured to detect persons and objects for collision avoidance.

14. The mobile locker of claim 1, further including a display affixed to the storage container.

15. A method, comprising:
   receiving, by an electronic device, a selection of a command for a mobile locker comprising a storage container removably coupled to a mobility unit;
   transmitting, by the electronic device, the command via a communication network to the mobile locker;
   receiving, by the electronic device, an indication that the command was received by the mobile locker; and
   receiving, by the electronic device, a current location of the mobile locker.

16. The method of claim 15, wherein the command is a navigation command for the mobile locker.

17. The method of claim 15, wherein the command is a locking command for the mobile locker.

18. A system of mobile lockers, comprising:
   one or more mobile lockers, each mobile locker comprising a storage container removably coupled to a mobility unit and communicatively connected to a monitoring center to view a communications network;
   one or more displays in the monitoring center for monitoring fault status, external views, and power level of the one or more mobile lockers; and
   one or more controls in the monitoring center for monitoring a status and a location of the one or more mobile lockers.

19. The system of mobile lockers of claim 18, wherein the monitoring center comprises controls for remote control of the one or more mobile lockers.

20. The system of mobile lockers of claim 18, further comprising a mobile power unit to recharge the one or more mobile lockers.

* * * * *